United States Patent
Yüksel et al.

(10) Patent No.: US 12,237,850 B2
(45) Date of Patent: Feb. 25, 2025

(54) WIDEBAND-TUNABLE RF RECEIVER WITH HIGH DYNAMIC RANGE AND HIGH OUT-OF-BAND REJECTION

(71) Applicant: Eridan Communications, Inc., Mountain View, CA (US)

(72) Inventors: Hazal Yüksel, Sunnyvale, CA (US); Douglas Kirkpatrick, San Francisco, CA (US); Dubravko Babić, Milpitas, CA (US)

(73) Assignee: Eridan Communications, Inc., Sunnyvale, CA (US)

( * ) Notice: Subject to any disclaimer, the term of this patent is extended or adjusted under 35 U.S.C. 154(b) by 384 days.

(21) Appl. No.: 17/934,758

(22) Filed: Sep. 23, 2022

(65) Prior Publication Data

US 2024/0106464 A1 Mar. 28, 2024

(51) Int. Cl.
  *H04B 1/00* (2006.01)
  *H04B 1/10* (2006.01)
  *H04B 1/30* (2006.01)
(52) U.S. Cl.
  CPC ............ *H04B 1/006* (2013.01); *H04B 1/10* (2013.01); *H04B 1/30* (2013.01); *H04B 2001/307* (2013.01)
(58) Field of Classification Search
  CPC . H04B 1/006; H04B 1/10; H04B 1/30; H04B 2001/307; H04B 1/1036
  USPC ...................................................... 455/552.1
  See application file for complete search history.

(56) References Cited

U.S. PATENT DOCUMENTS

| | | | |
|---|---|---|---|
| 8,620,254 B2 | 12/2013 | Molnar et al. | |
| 9,148,186 B1* | 9/2015 | Wu | H04B 1/123 |
| 9,356,636 B1 | 5/2016 | Mak et al. | |
| 2002/0151287 A1* | 10/2002 | Lindquist | H03L 7/0805 |
| | | | 455/256 |
| 2009/0088124 A1 | 4/2009 | Schuur et al. | |
| 2009/0156152 A1* | 6/2009 | Sahota | H04B 1/18 |
| | | | 455/314 |
| 2015/0214985 A1* | 7/2015 | Lee | H03H 7/1766 |
| | | | 455/77 |

OTHER PUBLICATIONS

WIPO/ISA, International Search Report (ISR) and Written Opinion (WO) from Int'l Appl. No. PCT/US23/31116.

(Continued)

*Primary Examiner* — Tanmay K Shah
(74) *Attorney, Agent, or Firm* — Patent Law Professionals, P.C.; William E. Winters

(57) ABSTRACT

A wideband-tunable radio frequency (RF) receiver having a tunable RF bandpass filter (RF BPF) and passive mixer-first receiver (PMF-Rx) is disclosed. The tunable RF BPF and PMF-Rx operate synergistically, exploiting the intrinsic impedance translation property of the PMF-Rx, to suppress out-of-band interferers as well as in-band interferers at the receiver front end and thereby enhance the receiver's signal-to-noise ratio and overall dynamic range. In one embodiment of the invention the tunable RF BPF and PMF-Rx are independently tunable and afford the receiver the ability to reject or suppress interferers that might not otherwise be able to be rejected or suppressed.

24 Claims, 16 Drawing Sheets

(56) References Cited

OTHER PUBLICATIONS

Ghaffari et al., "A differential 4-path highly linear widely tunable on-chip band-pass filter," 2010 IEEE Radio Frequency Integrated Circuits Symposium, pp. 299-302, 2010.
Andrews et al., "A Passive Mixer-First Receiver With Digitally Controlled and Widely Tunable RF Interface," IEEE Journal of Solid-State Circuits, vol. 45, No. 12, pp. 2696-2708, Dec. 2010.
Murphy et al., "A blocker-tolerant wideband noise-cancelling receiver with a 2dB noise figure," 2012 IEEE International Solid-State Circuits Conference, pp. 74-76, 2012.
Klumpernik et al., "N-path filters and mixer-first receivers: A review." 2017 IEEE Custom Integrated Circuits Conference (CICC). IEEE, 2017.
Moon et al., "Substrate integrated evanescent-mode cavity filter with a 3.5 to 1 tuning ratio" IEEE microwave and wireless components letters, vol. 20, No. 8, pp. 450-452, 2010.
Wu et al., "A passive-mixer-first receiver with LO leakage suppression, 2.6 dB NF, > 15dBm Wide-Band IIP3, 66dB IRR Supporting Non-contiguous Carrier Aggregation." 2015 IEEE Radio Frequency Integrated Circuits Symposium (RFIC), IEEE, 2015.
Yang et al., "Optimized design of N-phase Passive Mixer-First Receivers in Wideband Operation," IEEE Transactions on Circuits and Systems, vol. 62, No. 11, 2015.
Joshi et al., "High-Q Fully Reconfigurable Tunable Bandpass Filters, IEEE Transactions on Microwave Theory and Techniques," vol. 57, No. 12, Dec. 2009.

\* cited by examiner

Duty Cycle = 25%
(for N = 4)

WIDEBAND-TUNABLE RF RECEIVER WITH HIGH DYNAMIC RANGE AND HIGH OUT-OF-BAND REJECTION

BACKGROUND OF THE INVENTION

A radio frequency (RF) receiver is a fundamental and essential component of any RF communications system. It is responsible for recovering information carried by radio waves captured by its antenna and for converting the recovered information into a useable form, such as audio, video or data. FIG. 1 is a drawing depicting the principal components of a conventional RF receiver 100. The conventional RF receiver 100 includes an antenna 102; a receiver (RX) front end that includes an RF filter 104, low-noise amplifier (LNA) 106, mixer 108, and local oscillator (LO) 110; an analog processing section 112; and a digital back-end 114. The RF filter 104 is a bandpass filter configured so that the center frequency of its passband is aligned to a desired receive band. The LNA 106 is designed to have a low noise figure and is responsible for amplifying the typically-very-weak RF signals captured by the receiver's antenna 102 and without itself introducing significant noise into the system that would otherwise undermine the receiver's sensitivity. The mixer 108 and LO 110 operate together to downconvert the amplified RF signals to a lower frequency, either directly to baseband, in which case $f_{LO}=f_{RF}$, or first to some lower intermediate frequency $f_{LO}$ $f_{LO}<f_{RF}$) before being ultimately downconverted a second time to baseband. The analog processing section 112 typically includes a variable gain amplifier (VGA) that amplifies the downconverted signal, a low-pass filter (LPF) that filters out undesirable high-frequency byproducts produced during the downconversion process. An analog-to-digital converter (ADC) converts the resulting filtered analog waveform to a digital signal for the digital back-end 114, which, among other things, provides additional filtering in the digital domain to help reject or suppress both in-band and out-of-band interferers (i.e., "blockers").

The RF filter 104 in the conventional RF receiver 100 typically comprises a surface acoustic wave (SAW) filter or a bulk acoustic wave (BAW) filter. SAW and BAW filters are desirable from the standpoint that they can provide high out-of-band (OOB) rejection. However, a significant drawback is that they are not tunable. The lack of tunability can be overcome to some extent by employing a bank of individually selectable SAW or BAW filters, with each fixed-frequency SAW or BAW filter dedicated to a different receive band. However, such an approach is cumbersome, lacks true agility, is not entirely effective, and for most circumstances is impractical for a receiver that must operate at frequencies above 1 GHz.

Another problem with the conventional RF receiver 100, whether it employs just a single SAW or BAW filter or a bank of SAW or BAW filters, is that it has no ability at the front end to block in-band interferers in any given or selected band. In-band interferers are caused by nonlinearities in the receiver's components, such as in the LNA 106, for example. They may also occur due to external influences. For example, and as illustrated in FIG. 2, an in-band interferer may be an intrusive signal 206 unwantedly received from an enemy jammer in a situation where the receiver is operating in a military environment, or, as illustrated in FIG. 3, may be one or more non-intrusive signals 204 that tend to interfere with the desired signal 202 when the receiver is operating in a congested commercial environment, for example, due to too many communications devices operating in various channels A, B, C, D (desired signal), E within the same receive band. Regardless of the source or cause of the in-band interferer, the conventional RF receiver 100 must rely exclusively on its digital back-end 114 to block or attenuate the in-band interferers. This is a major limitation of the conventional RF receiver 100 since a multiplicity of in-band interferers among the desired RF signal tend to intermodulate at the front end, resulting in distortion products that raise the noise floor of the receiver 100 and reduce its dynamic range. In-band interferers of sufficient magnitude can also cause the receiver's LNA 106 to saturate, resulting in further reduction of the signal-to-noise ratio (SNR) at the front end and a concomitant reduction in channel capacity and data throughput due to the receiver only being capable of demodulating lower-order modulation formats, as conceptually illustrated in FIG. 4.

Finally, although SAW and BAW filters can be manufactured to provide high out-of-band (OOB) rejection outside a given frequency band, because they lack true agility and are inherently fixed-frequency devices, OOB rejection by the conventional receiver 100 is often only moderately effective and in some circumstances entirely impossible, particularly in circumstances where the receiver 100 must be tuned across multiple receive bands or across multiple channels within a given receive band.

BRIEF SUMMARY OF THE INVENTION

A wideband-tunable radio frequency (RF) receiver having a tunable RF bandpass filter (RF BPF) and passive mixer-first receiver (PMF-Rx) is disclosed. The tunable RF BPF and PMF-Rx operate synergistically, exploiting the intrinsic impedance translation property of the PMF-Rx, to suppress out-of-band interferers as well as in-band interferers at the receiver front end and thereby enhance the receiver's signal-to-noise ratio and overall dynamic range. In one embodiment of the invention the tunable RF BPF and PMF-Rx are independently tunable and afford the receiver the ability to reject or suppress interferers that might not otherwise be able to be rejected or suppressed.

Further features and advantages of the invention, including a detailed description of the above-summarized and other exemplary embodiments of the invention, will now be described in detail with respect to the accompanying drawings, in which like reference numbers are used to indicate identical or functionally similar elements.

DETAILED DESCRIPTION

Figure 5:
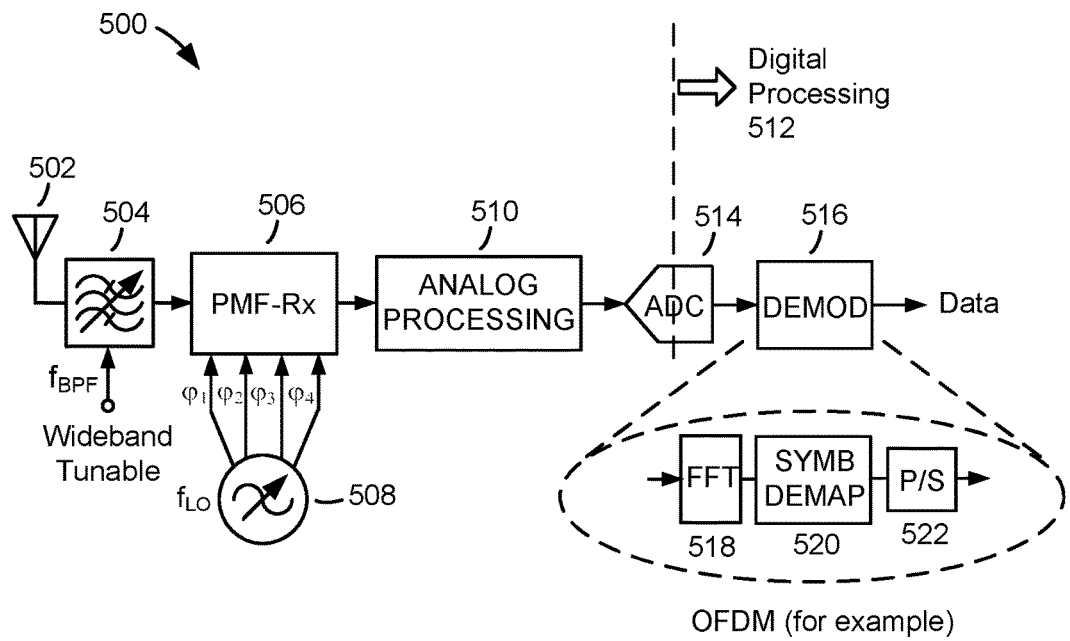
FIG. 5 is a block diagram of an RF receiver, according to one embodiment of the present invention.

Referring to FIG. 5, there is shown an RF receiver 500 according to one embodiment of the present invention. The RF receiver 500 (also referred to as "the receiver 500" in the detailed description that follows) comprises an antenna 502; a front end including a tunable RF bandpass filter (RF BPF) 504 and a passive mixer-first receiver (PMF-Rx) 506 controlled by a multi-phase local oscillator (LO) clock generator 508; an analog processing section 510; and a digital processing section 512.

The antenna 502 serves to transduce modulated RF electromagnetic waves that impinge upon it into RF signals. However, then, rather than using a fixed-frequency SAW or BAW filter to filter the RF signals (as is done in the conventional receiver 100), the RF signals are filtered through both the tunable RF BPF 504 and PMF-Rx 506. As will be become more clear in the detailed description that follows, the PMF-Rx 506 has a dual purpose. Not only does it serve as a mixer that downconverts the received RF signal to baseband, it also serves, reversely, as an RF BPF that operates synergistically with the tunable RF BPF 504 to enhance the signal-to-noise ratio (SNR) of the receiver 500 at its front end.

The analog processing section 510 of the receiver 500 comprises a low-pass filter (LPF) that filters out undesirable high-frequency byproducts produced during the downconversion process performed by the PMF-Rx 506 and a variable gain amplifier (VGA).

At the interface between the analog and digital processing sections 510 and 512 an analog-to-digital converter (ADC) 514 samples and digitizes the filtered and amplified analog baseband signals, and a digital demodulator 516 in the digital processing section 512 then recovers the digital data that was modulated on and encoded in the RF carrier at the transmitter side of the communications system.

The receiver 500 is not restricted to operating in any particular communications network or environment or according to any particular modulation format or encoding scheme. Nevertheless, in one particular embodiment of the invention, the receiver 500 is designed for operation in a communications system that utilizes orthogonal frequency-division multiplexing (OFDM), in which case the digital demodulator 516 comprises a fast Fourier transform (FFT) 518, symbol demapper 520, and a parallel-to-serial converter (i.e., multiplexer) 522, as denoted in FIG. 5. As will be appreciated by those of ordinary skill in the art, the FFT 518 serves to translate the digitized time-domain OFDM symbols produced at the output of the ADC 510 into a plurality of frequency-domain subcarriers; the symbol demapper 520 demodulates the plurality of subcarriers to recover the digital data encoded in each subcarrier; and the P/S converter 522 multiplexes the resulting demapped subcarrier digital data into a single serial data stream that replicates the original high-speed data stream introduced to the RF transmitter at the transmitter side of the communications system. Preferably, the FFT 518, symbol demapper 520, and P/S converter 522 are configured in a field-programmable gate array (FPGA) or are encoded in software as a set of computer program instructions executed by an associated microcontroller.

Figure 6:
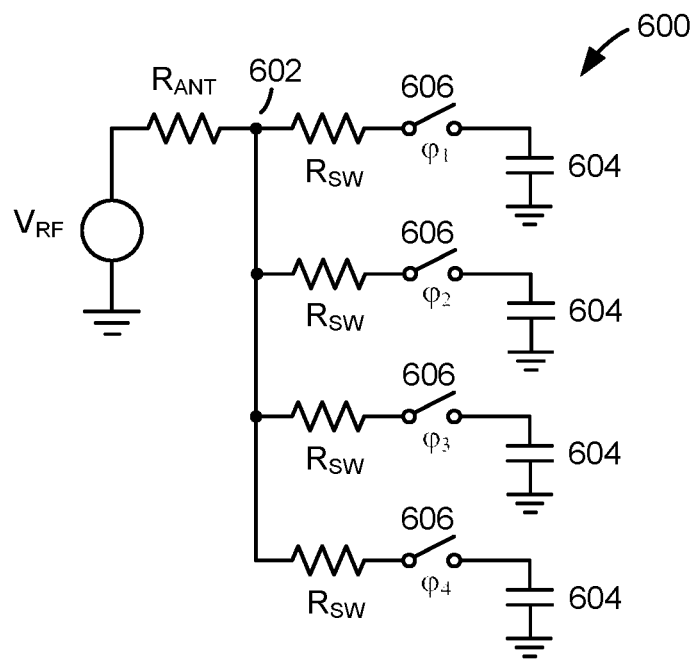
FIG. 6 is a schematic diagram showing the salient components of the passive mixer-first receiver (PMF-Rx) employed in the RF receiver depicted in FIG. 5.
Figure 7:
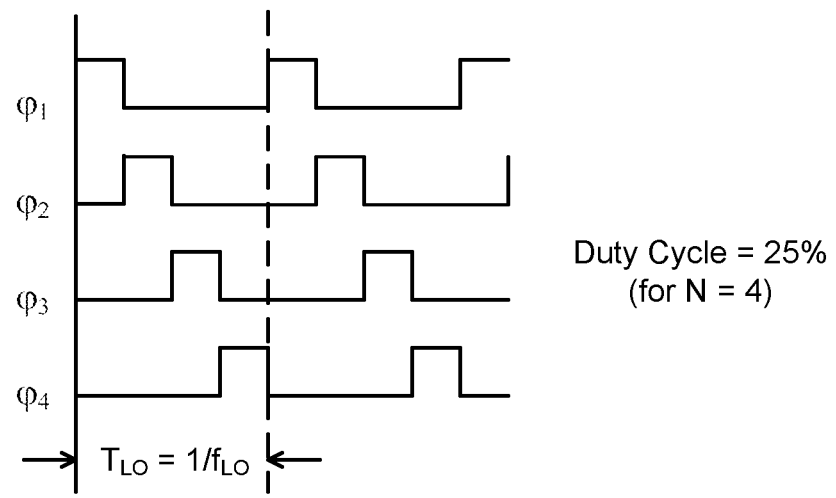
FIG. 7 is timing diagram of the N non-overlapping phases $\varphi_1, \varphi_2, \ldots, \varphi_N$ of the multi-phase local oscillator (LO) clock used to control the PMF-Rx depicted in FIG. 6.

In general, and as illustrated in FIG. 6, the PMF-Rx 506 (600) comprises N parallel branches (or N "paths") connected between an output node 602 and ground, where N is an integer greater than or equal to two. (N=4 in this example, but could be higher.) Each branch includes a capacitor 604 and a switch 606 that is preferably implemented using a transistor having a low ON resistance $R_{SW}$. The switches 606 are controlled to switch ON and OFF sequentially and cyclically, one at a time, by N non-overlapping phases $\varphi_1$, $\varphi_2$, ..., $\varphi_N$ of a multi-phase LO clock (see FIG. 7) produced by the multi-phase LO clock generator 508, which in one embodiment of the invention, like the RF BPF 504, is also tunable. Switching the switches 606 in this manner causes the switches 606 to collectively serve as a passive mixer that downconverts the RF spectrum of the input RF signal directly to baseband, where it is next low-pass-filtered by the series combination of the $(R_{ANT}+R_{SW})$ and C in the N branches of the PMFR-Rx 506 and then ultimately processed by the receiver's 500's analog and digital processing sections 510 and 512.

Figure 8:
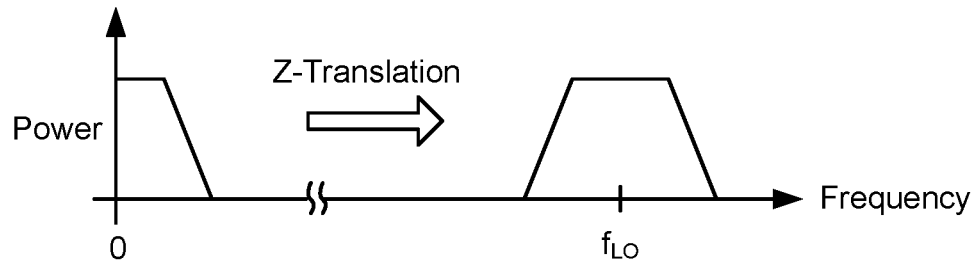
FIG. 8 is a frequency-domain drawing illustrating how an impedance translation property of the PMF-Rx in the RF receiver depicted in FIG. 5 results in the PMF-Rx's baseband low-pass-frequency response being effectively translated to an RF bandpass filter (BPF) centered at $f_{LO}$.

The commutating action of the switched capacitors 604 not only aids in the downconversion process, it also causes each of the capacitors 604 to exhibit an effective impedance of $1/j[(\omega-\omega_{LO})C_{BB}]$ (so long as $(R_{ANT}+R_{SW})\times C \gg 1/f_{LO}$). Accordingly, the low-pass filter (LPF) response of the PMF-Rx 506 at baseband effectively translates the LPF at baseband to an RF BPF centered at the frequency $f_{LO}$ of the LO, as illustrated in FIG. 8. The PMF-Rx 600 thus not only operates as a passive mixer that downconverts the input RF signal to baseband, it also serves as an upconverter that returns the shaped spectrum back to its original RF center frequency $f_{LO}$. This impedance translation property of the PMF-Rx 600 is exploited by the receiver 500 to provide a higher level of in-band interferer rejection at the front end than can be realized in the conventional radio receiver 100, thereby enhancing the signal-to-noise ratio (SNR) of the receiver 500 at its front end and consequently its overall dynamic range.

The −3 dB bandwidth (BW) of the impedance-translated frequency response of the PMF-Rx 700 around $f_{LO}$ is inversely proportional to both the number of branches N and the capacitance C of the switching capacitors 704. Taking this dependency into consideration, along with the fact that most network operators partition their Rx bands into a plurality of channels, in one embodiment of the invention the number of branches N in the PMF-Rx 506 and the capacitance C of the PMF-Rx capacitors 604 are chosen so that the −3 dB BW of the PMF-Rx-506 (600) passband is comparable to (e.g., essentially equal to, slightly wider than, or slightly narrower than) the bandwidth of a single channel.

Figure 9:
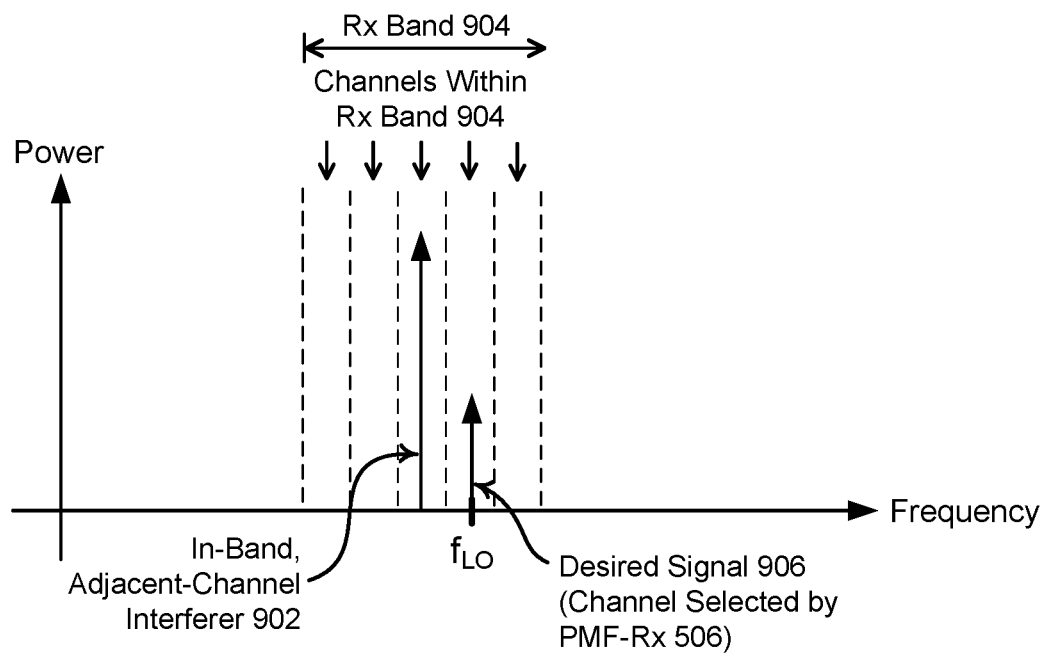
FIG. 9 is frequency-domain drawing that illustrates how the PMF-Rx by itself (i.e., without the added assistance of the RF BPF in the receiver depicted in FIG. 5) may be unable to reject or sufficiently suppress an in-band interferer that falls within the same Rx band as the desired signal but within a different channel.
Figure 10:
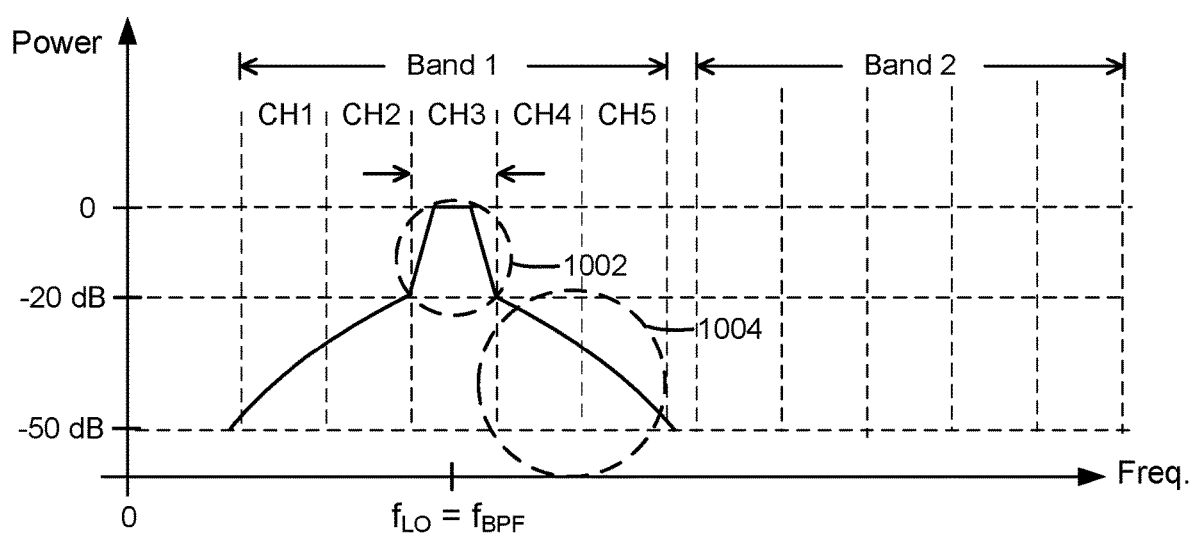
FIG. 10 is a composite frequency response diagram illustrating how the RF BPF and PMF-Rx in the receiver depicted in FIG. 5 collaborate to provide a high level of OOB rejection and in-band interferer rejection over a wide range of tuning frequencies, in accordance with one aspect of the present invention.

In some advanced receiver applications the PMF-Rx-506 (700) is by itself incapable of providing sufficient rejection or suppression of an in-band interferer that is in close proximity to the desired RF signal, for example, an in-band interferer 902 that falls within the same Rx band 904 as the desired signal 906 but within a different receive-band channel (e.g., an adjacent channel), as illustrated in FIG. 9. (Note: For the purpose of this disclosure the term "interferer" is synonymous with the term "blocker" and also has a meaning that encompasses the term "jammer.") To address this problem the receiver 500 is further equipped with the tunable RF BPF 504. Exploiting the impedance translation property of the PMF-Rx 506, the tunable RF BPF 504 and PMF-Rx 506 operate synergistically to reject or suppress in-band interferers that would not otherwise be able to be rejected or sufficiently suppressed if just a single one of the filters was used. FIG. 10 is a simplified composite frequency response diagram illustrating this synergistic effect and how the combined frequency response of the tunable RF BPF 504 and PMF-Rx 506 enhance the receiver's 500's in-band-interferer rejection capability. The first and second circles 1002 and 1004 in FIG. 10 highlight the filtering contributions provided by the PMF-Rx 506 and tunable RF BPF 504, respectively (according to one particular exemplary embodiment of the receiver 500), and how each filter individually shapes the spectrum of the overall RF filter response. By virtue of its impedance translation property the PMF-Rx 506 is seen to provide up to 20 dB adjacent-channel rejection with a width of a single channel and, with the center frequency $f_{BPF}$ of the tunable RF BPF 504 aligned to the LO frequency $f_{LO}$ of the PMF-Rx 506, the tunable RF BPF 504 is seen to provide 20-30 dB band-wide rejection across the entire Rx band ("Band 1" in the drawing).

Figure 11:
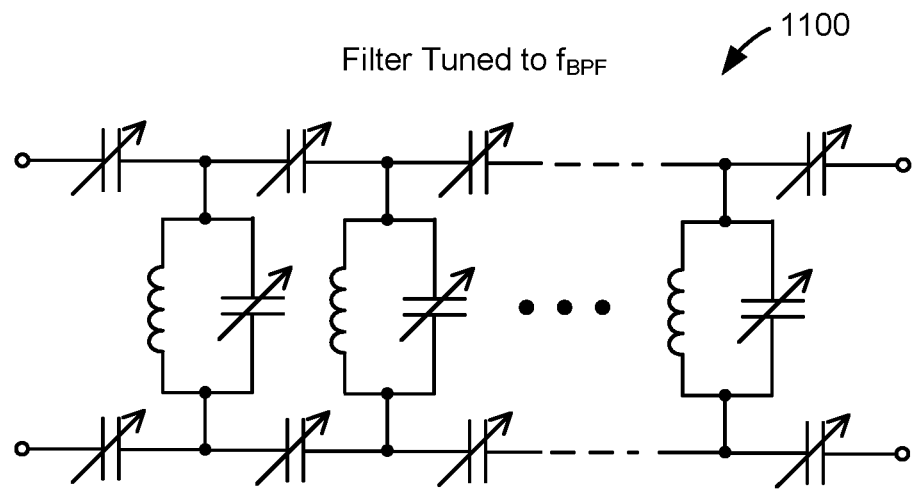
FIG. 11 is a schematic diagram of a tunable, electrically-coupled (i.e., capacitively-coupled) RF bandpass filter that can be used to implement the RF BPF in the RF receiver depicted in FIG. 5.
Figure 12:
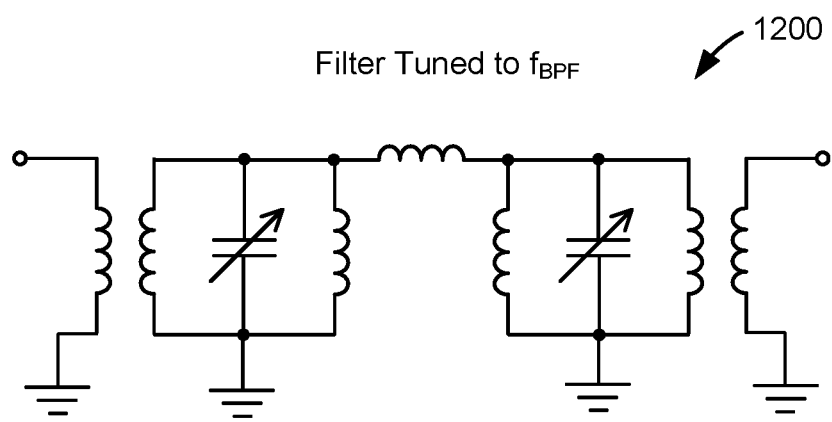
FIG. 12 is a schematic diagram of a tunable, magnetically-coupled (i.e., inductively-coupled) RF bandpass filter that can be used to implement the RF BPF in the RF receiver depicted in FIG. 5.

The tunable RF BPF 504 can be implemented in various ways. In one embodiment of the invention it comprises two or more electrically-coupled (i.e., capacitively-coupled) LC tank circuits, similar to as depicted in FIG. 11, and in another comprises two or more magnetically-coupled (i.e., inductively-coupled) LC tank circuits, similar to as depicted in FIG. 12. In yet another embodiment of the invention, the tunable RF BPF 504 comprises a tunable, high-Q, coupled-cavity BPF formed in a substrate-integrated waveguide (SIW), similar to one of the evanescent-mode cavity filters described in S. Moon, et al., "Substrate Integrated Evanescent-Mode Cavity Filter With a 3.5 to 1 Tuning Ratio," in *IEEE Microwave and Wireless Components Letters*, vol. 20, no. 8, pp. 450-452, August 2010, and H. Joshi et al., "High-Q Fully Reconfigurable Tunable Bandpass Filters," in *IEEE Transactions on Microwave Theory and Techniques*, vol. 57, no. 12, pp. 3525-3533, December 2009, both of which are incorporated herein by reference. In one particular implementation of the receiver 500 that utilizes the SIW coupled-cavity approach, the tunable RF BPF 504 has a tuning ratio of 2.5 or greater, is continuously and dynamically tunable over a tuning range of $f_{BPF},min<f_{BPF}<f_{BPF,max}$=600 MHz$<f_c<$3.7 GHz, and provides a band-wide interferer rejection capability of 20 dB or more across the entire tuning range.

Figure 1:
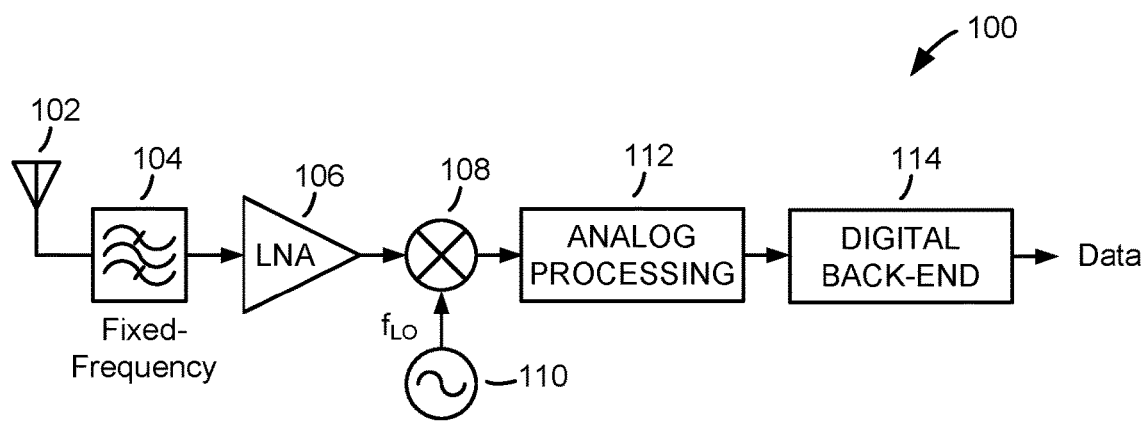
FIG. 1 is a block diagram of a conventional radio frequency (RF) receiver.
Figure 2:
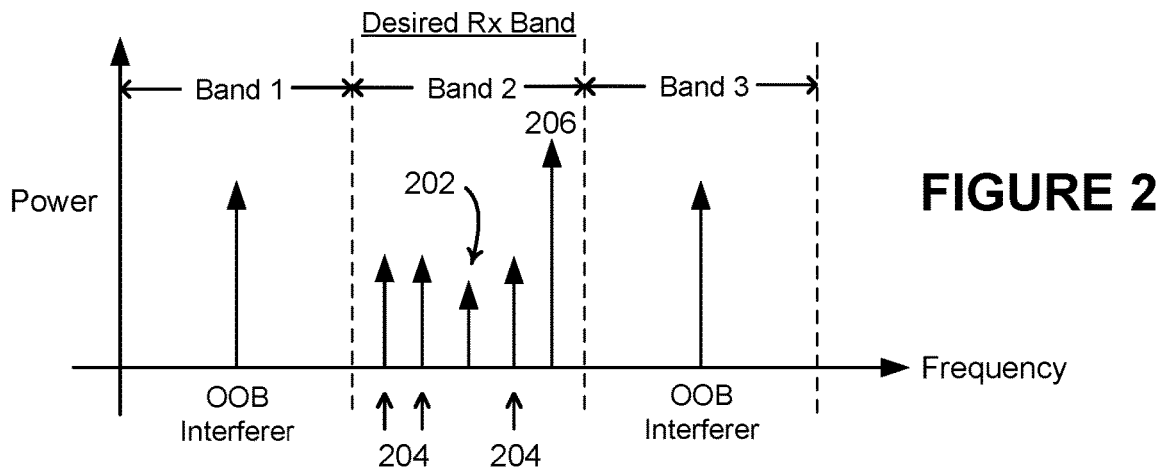
FIG. 2 is a frequency-domain drawing illustrating how in-band and out-of-band (OOB) interferers can undesirably appear in or near the receive (Rx) band of a desired RF receive signal.
Figure 3:
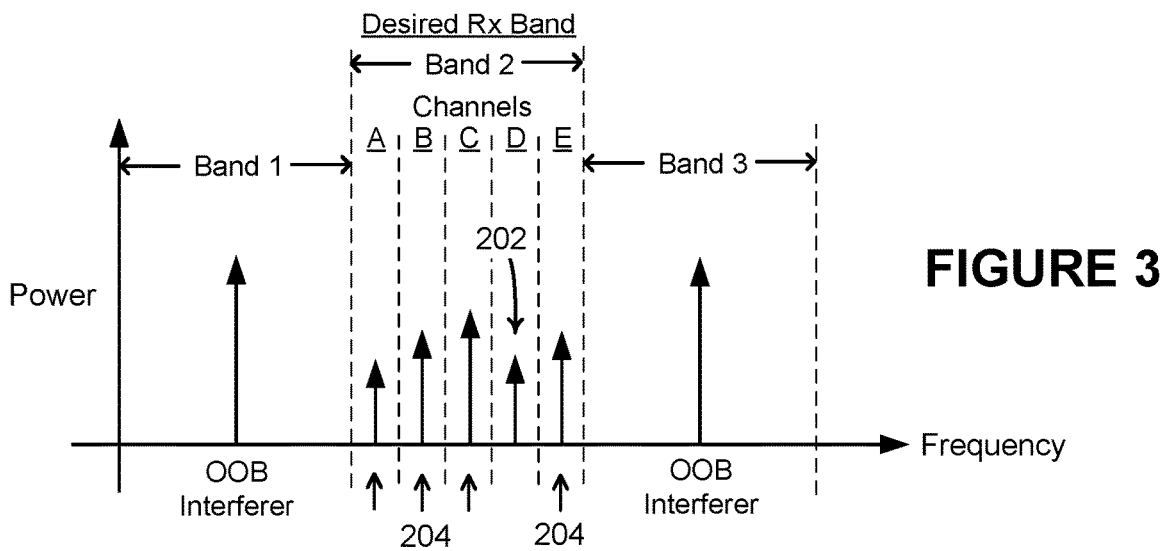
FIG. 3 is a frequency-domain drawing illustrating how one or more non-intrusive in-band interferers in one or more channels of a desired Rx band can adversely affect the signal-to-noise ratio (SNR) of a desired RF signal.
Figure 4:
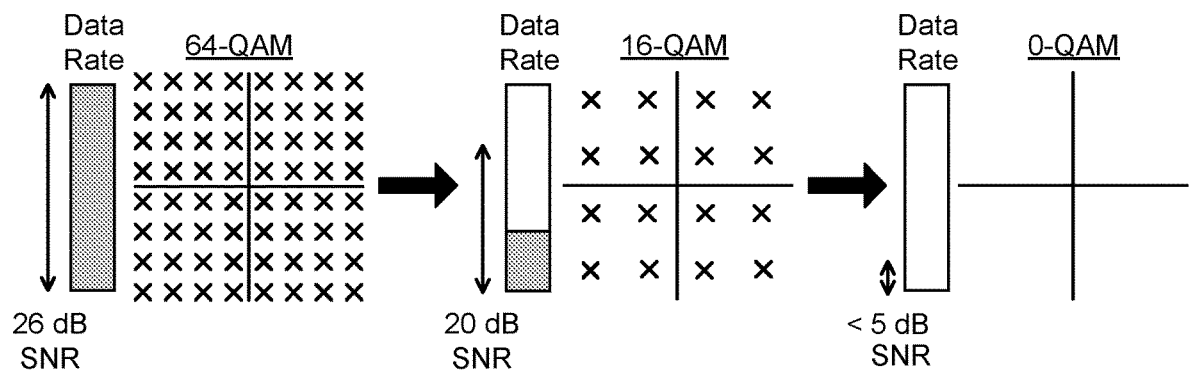
FIG. 4 is a drawing of a series of constellation diagrams that conceptually illustrate how the data rate capability of a receiver diminishes as the SNR in a receiver progressively degrades due to increasing levels of interference.
Figure 13:
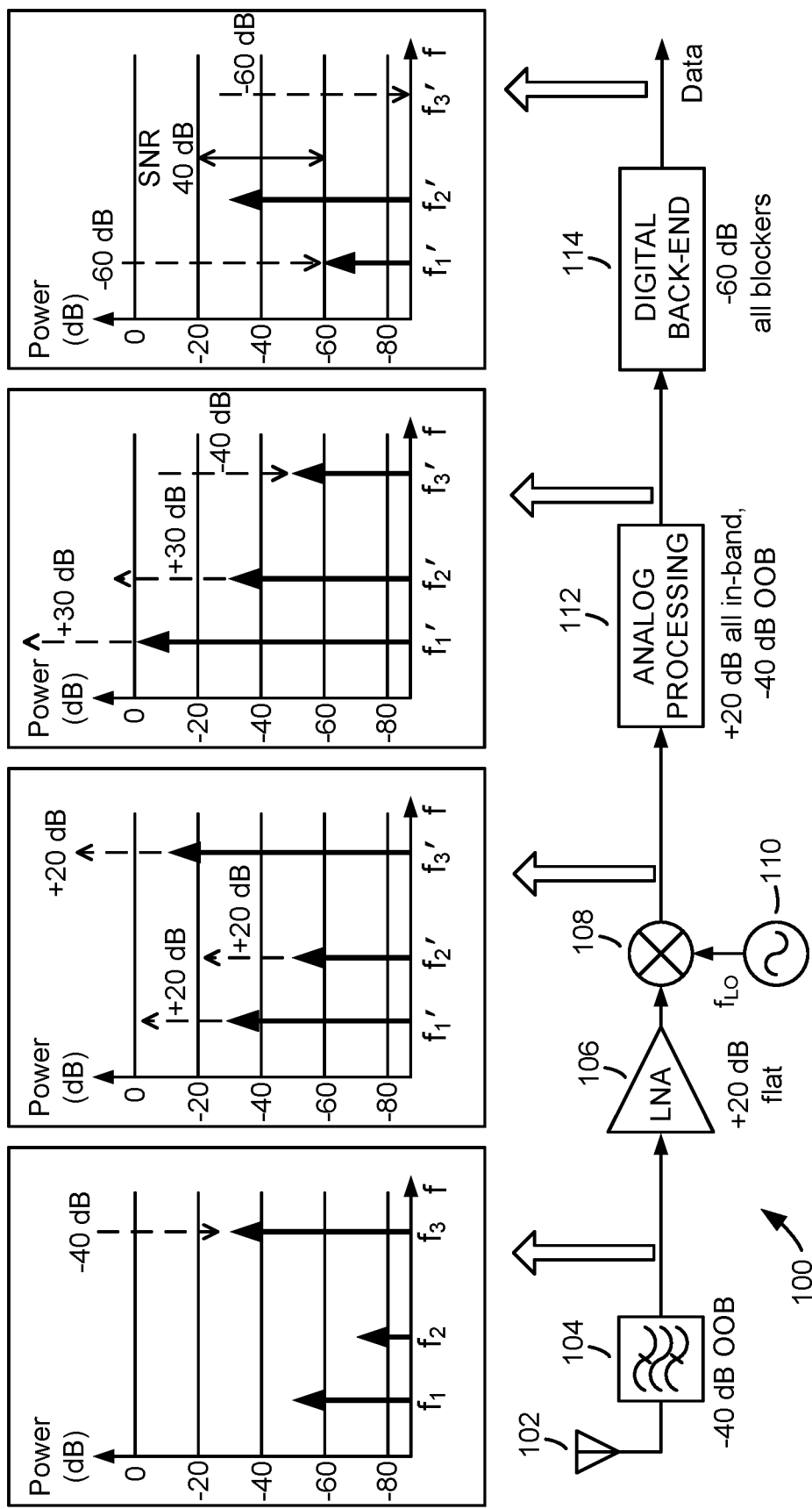
FIG. 13 is a drawing showing the signal flow path through the conventional receiver depicted in FIG. 1 and various frequency-domain spectra at various points along the signal path.
Figure 14:
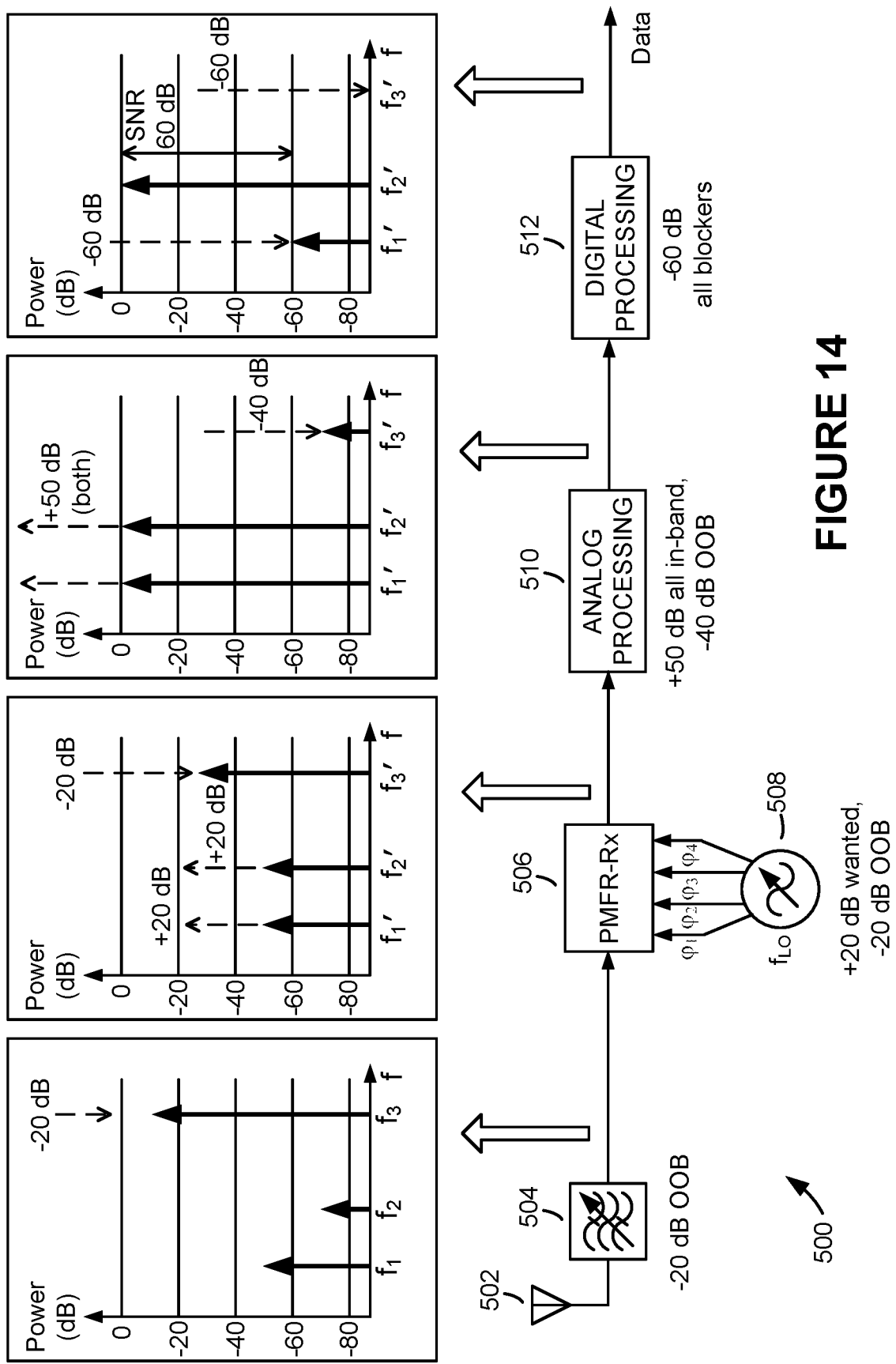
FIG. 14 is a drawing showing the signal flow path through the receiver depicted in FIG. 5 and various frequency-domain spectra at various points along the signal path.

To further illustrate how the tunable RF BPF 504 and PMF-Rx 506 collaborate to enhance the SNR of the receiver 500 at its front end and increase its overall dynamic range over that which can be realized in the conventional RF receiver 100, reference is now made to FIGS. 13 and 14. FIG. 13 shows the signal flow path through the conventional RF receiver 100 depicted in FIG. 1, and FIG. 14 shows the signal flow path through the receiver 500 depicted in FIG. 5. The two figures also show frequency spectra at different points along their respective signal paths. For purpose of this example, it is assumed that the two receivers are co-located in the same environment, specifically, a crowded urban environment where a wanted (i.e., desired) RF signal $f_2$ arriving at the receivers' antennae 102 and 502 is weaker (lower power) compared to both an in-band blocker $f_1$ and OOB blocker $f_3$. It is further assumed that the received power of the in-band blocker $f_1$ is 20 dB greater relative to the received power of the wanted signal $f_2$, that the received power of the OOB blocker $f_3$ is 50 dB greater relative to the wanted signal $f_2$, and that the receiver 500 has an RF filter frequency response like that depicted in FIG. 10 whereas the conventional RF receiver 100 has an RF filter response typical of a fixed-frequency SAW filter.

With respect to the conventional RF receiver 100 (FIG. 13), the fixed-frequency SAW filter 104 operates to suppress the OOB blocker $f_3$ by 40 dB. Next, the LNA 106 amplifies all RF signals, $f_1$, $f_2$ and $f_3$, by 20 dB. Once downconverted to baseband, the analog processing section 112 amplifies both the in-band baseband signals (i.e., both the wanted downconverted signal $f_2'$ and the downconverted in-band blocker $f_1'$) by 30 dB and low-pass filters the amplified result to further suppress the downconverted OOB blocker $f_3'$ by −40 dB. Finally, at the digital back-end 114, digital filtering is employed to further suppress both the baseband in-band blocker $f_1'$ relative to the wanted baseband signal $f_2'$ and the baseband OOB blocker $f_3'$ (both by −60 dB). The final RF spectrum at the top-right corner of FIG. 13 reveals a final SNR of 40 dB.

Figure 15:
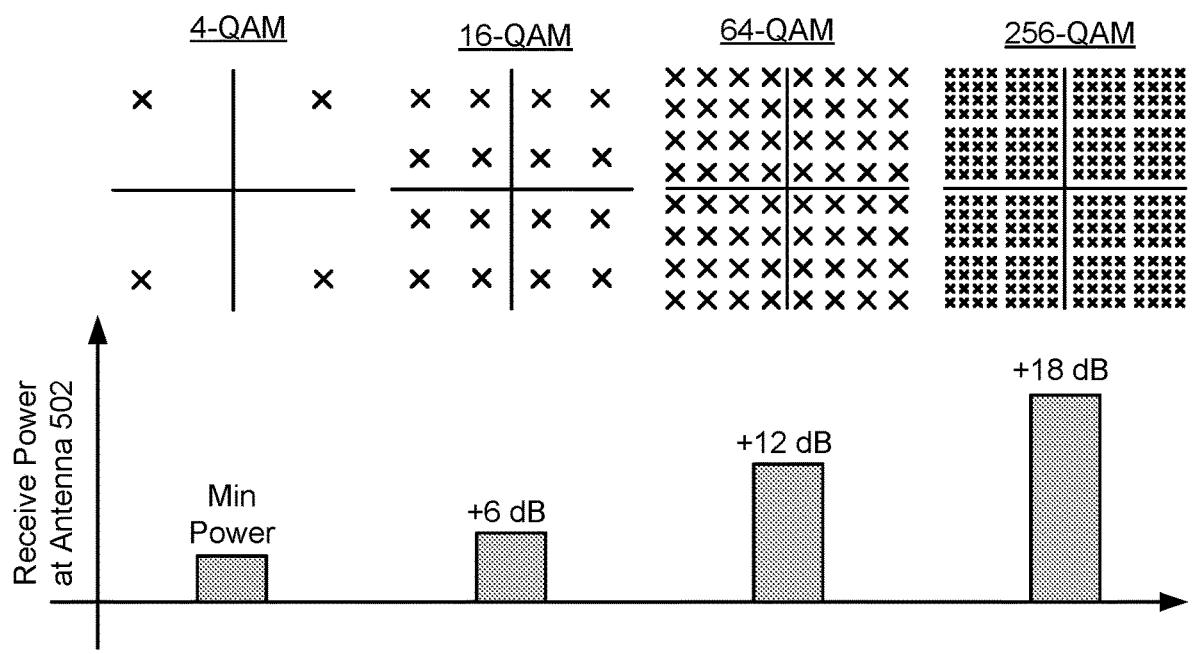
FIG. 15 is a drawing of a series of constellation diagrams that conceptually illustrate how the data rate capability of a receiver improves as the receiver's SNR improves.

Now, with respect to the receiver 500 of the present invention (FIG. 14), the tunable RF BPF 504 operates to suppress the OOB blocker $f_3$ by 20 dB. Next, the filtered result is filtered once again by the frequency-translated BPF provided by the PMF-Rx 506. In so doing the receiver 500 exploits the impedance translation property of the PMF-Rx 506 to improve the SNR of the wanted signal $f_2$ by 20 dB relative to the in-band blocker $f_1$. Accordingly, after being downconverted by the PMF-Rx 506 and amplified and low-pass filtered in the analog processing section 510, the in-band blocker $f_1'$ at baseband and the wanted baseband signal $f_2'$ both have essentially the same power level. Finally, after being digitally processed in the digital processing section 512, the final SNR is seen to be 60 dB, which is +20 dB higher than the 40 dB SNR achieved by the conventional RF receiver 100. Hence, not only is the wanted signal $f_2'$ relative to the noise floor in the receiver 500 of the present invention 100 times greater than that which can be realized at the output of the conventional RF receiver 100, the receiver 500 offers a comparable OOB rejection performance over its entire tuning range. The high SNR affords the receiver 500 the ability to demodulate high-order modulation formats, such as 64-QAM, 256-QAM, 1024 QAM, 4096-QAM, for example (see FIG. 15), and improve the realizable data rate by a factor of 64 or more over that attainable by the conventional RF receiver 100.

Figure 16:
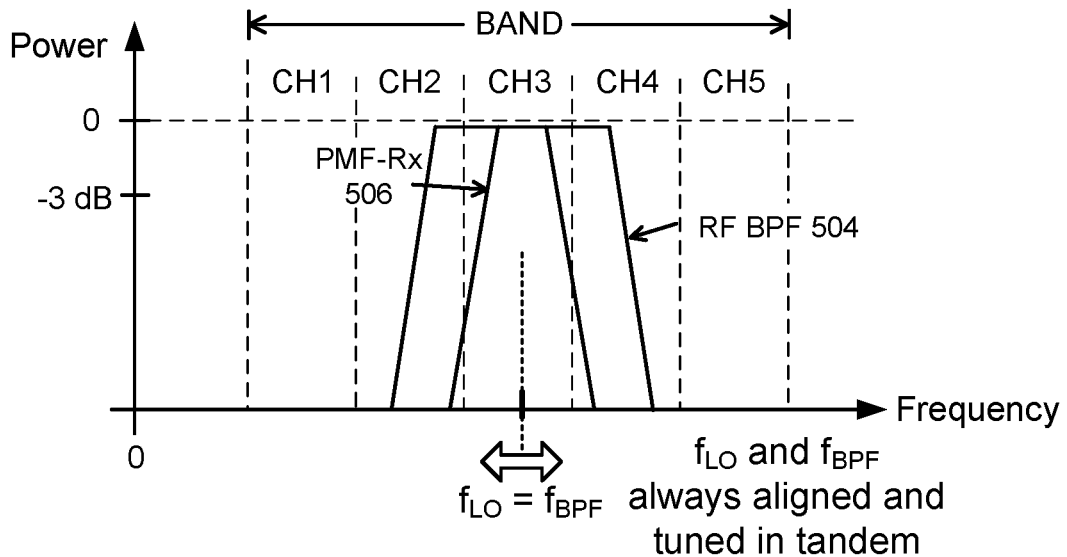
FIG. 16 is a frequency-domain drawing of the RF passbands provided by the RF BPF and PMF-Rx of the receiver depicted in FIG. 5, highlighting how in one embodiment of the invention the center frequency $f_{BPF}$ of the RF BPF's passband is always aligned and tuned in tandem with the center frequency $f_{LO}$ of the RF passband provided by the PMF-Rx.
Figure 17:
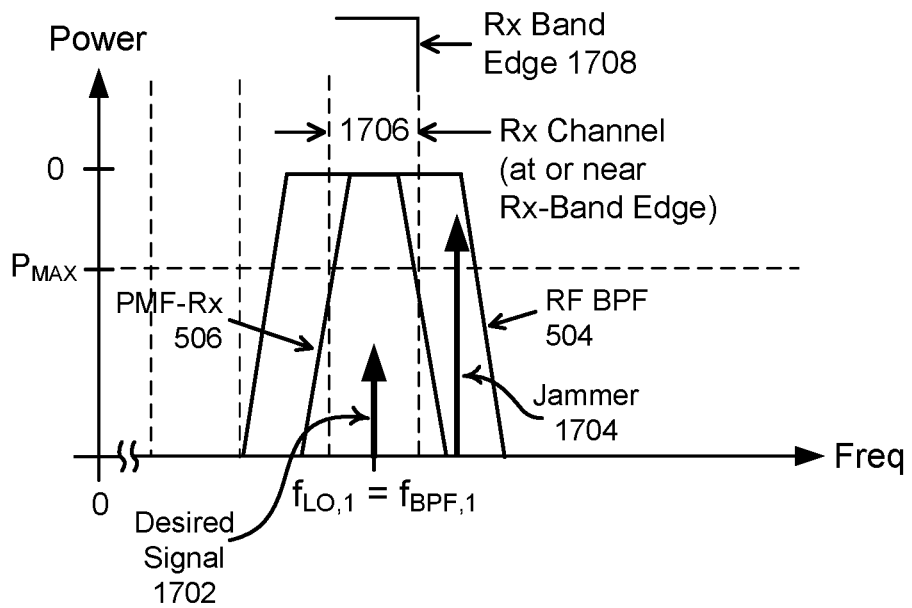
FIG. 17 is a frequency-domain drawing of the RF passbands provided by the RF BPF and PMF-Rx of the receiver depicted in FIG. 5, highlighting how in one particular circumstance an OOB interferer is unable to be rejected or sufficiently suppressed when the center frequency $f_{BPF}$ of the RF BPF passband is aligned with the center frequency $f_{LO}$ of the RF passband provided by the PMF-Rx.
Figure 18:
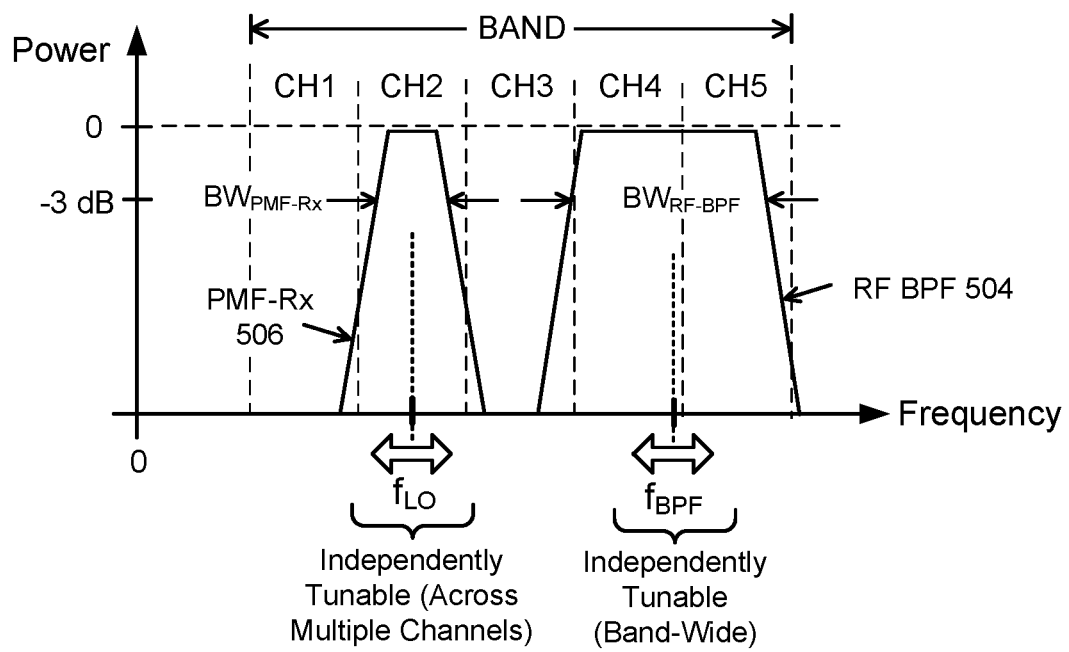
FIG. 18 is a frequency-domain drawing highlighting how in one embodiment of the present invention the center frequency $f_{BPF}$ of the RF BPF passband and the center frequency $f_{LO}$ of the RF passband provided by the PMF-Rx are independently tunable.

In most circumstances sufficient in-band interferer rejection and sufficient OOB interferer rejection can be achieved when the center frequency $f_{BPF}$ of the tunable RF BPF 504 is tuned to and aligned with the center frequency $f_{LO}$ of the RF frequency response provided by the PMF-Rx 506, i.e., when $f_{BPF}=f_{LO}$, as illustrated in FIG. 16. However, alignment of the two center frequencies does not always guarantee optimal interferer rejection or the level of rejection or suppression that is required or may be desired. For example, if an exceptionally strong interferer (e.g., a high-power jammer) happens to fall substantially within the passband of either filter, the combined filtering effect provided by the tunable RF BPF 504 and PMF-Rx 506 may be simply unable to suppress the in-band interferer to the extent needed or desired. Or, as illustrated in FIG. 17, if the desired signal 1702 is in a channel 1706 at or near the Rx band edge 1708 and the exceptionally strong interferer (e.g., high-power jammer 1704, in this example) happens to be in close proximity to that band edge 1708 and also falls substantially within the passband of the tunable RF BPF 504, rejecting or sufficiently suppressing the OOB jammer 1704 may not be entirely effective if the center frequencies are aligned, i.e., if $f_{BPF}=f_{LO}$. In either circumstance rejecting the jammer 1704 can be better achieved if the two center frequencies are tuned to different frequencies, i.e., are not aligned ($f_{BPF} \neq f_{LO}$). To facilitate this operational capability, in one embodiment of the invention the tunable RF BPF 504 and PMF-Rx 506 are designed so that they are independently tunable or, more specifically, so that the center frequencies $f_{BPF}$ and $f_{LO}$ of their respective RF passbands are independently tunable, as illustrated in FIG. 18.

Figure 19:
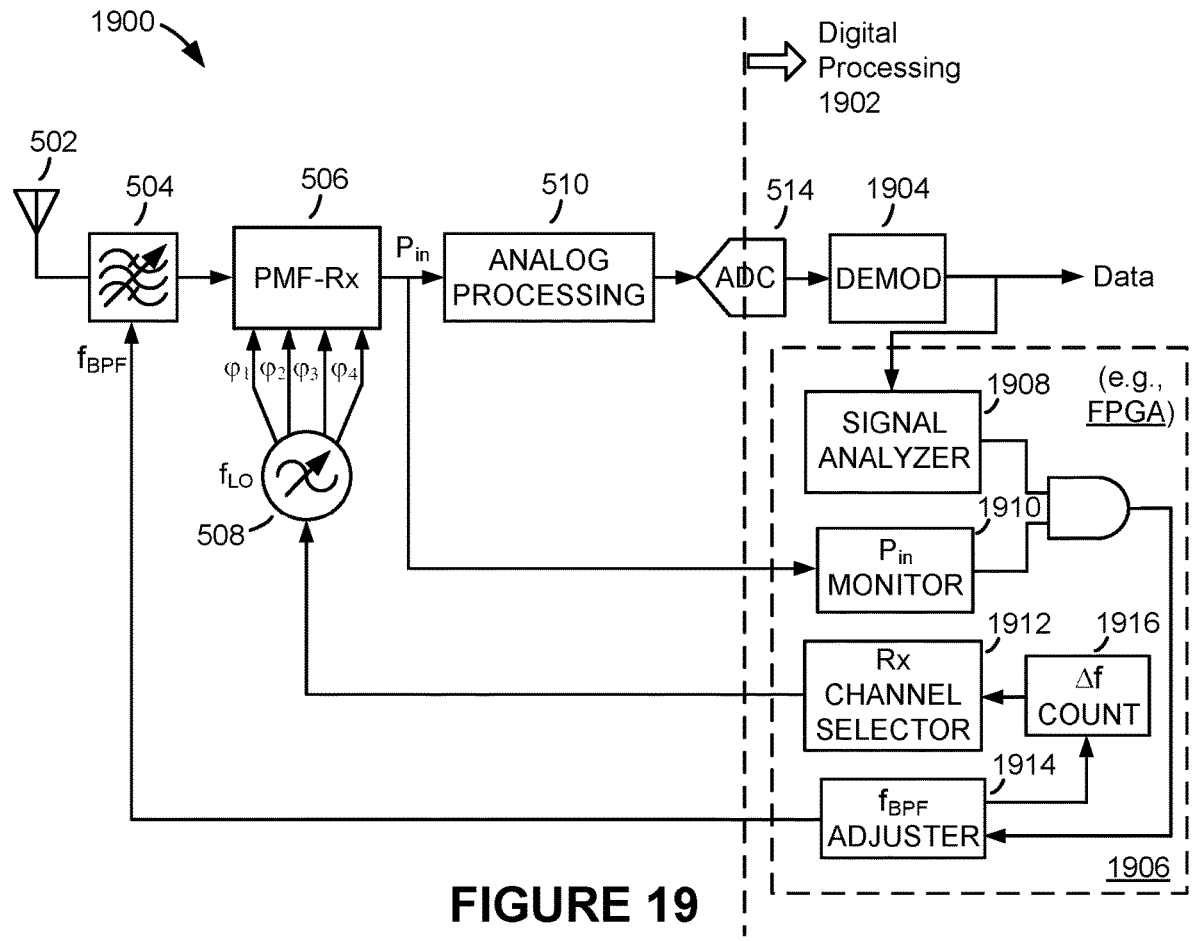
FIG. 19 is a block diagram of an RF receiver, according to another embodiment of the present invention.

FIG. 19 is a diagram illustrating one way the receiver 500 depicted in FIG. 5 can be modified to both detect and suppress exceptionally strong interferers (e.g., a high-power jammer) in circumstances where the tunable RF BPF 504 and PMF-Rx 506, with their passbands aligned, are unable to reject or sufficiently suppress the exceptionally strong interferers. In addition to including all of the elements of the receiver 500 depicted in FIG. 5, the receiver 1900 includes a signal analyzer 1908, an RF input power ($P_{in}$) monitor 1910, a Rx channel selector 1912, an $f_{BPF}$ adjuster 1914, and a $\Delta f$ counter 1916. The signal analyzer 1908 operates to measure the signal quality of the Rx signal produced at the output of the demodulator 1904 (for example, its error vector magnitude (EVM), bit error rate (BER), or other signal quality figure of merit). Meanwhile, the $P_{in}$ monitor 1910 monitors the RF input power $P_{in}$ of the received RF signal, preferably before being amplified by the VGA in the analog processing section 510. As explained in more detail below, the measured EVM (or measured BER or other measured signal quality figure of merit) and the monitored RF input power $P_{in}$ are used to detect and determine whether an exceptionally strong interferer (for example, a high-power jammer) is likely present and interfering with the reception of the desired Rx signal (such as the OOB jammer 1704 in FIG. 17, for example). The $f_{BPF}$ adjuster 1914 serves to adjust the center frequency $f_{BPF}$ of the tunable RF BPF 504 away from $f_{LO}$, incrementally by some small change in frequency $\Delta f$ in the process of attempting to reject the offending high-power interferer. And the $\Delta f$ counter 1916 serves to count the number of times the tunable RF BPF 504 has been tuned away from the Rx channel frequency $f_{LO}$ and determine whether the tunable RF BPF 504 has been tuned (i.e., scanned) across its entire tuning range $f_{BPF,min} < f_{BPF} < f_{BPF,max}$ in the process of attempting to reject the offending high-power interferer.

Figure 20:
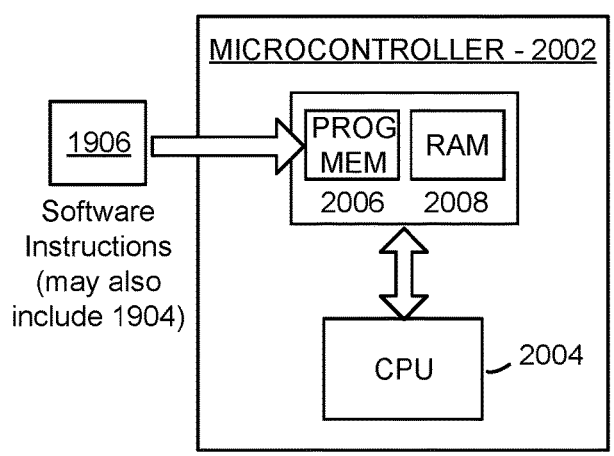
FIG. 20 is a simplified drawing of a microcontroller, which may be used to implement some or all of the components of the digital processing section of the RF receiver depicted in FIG. 19.

According to one embodiment of the invention, some or all of the signal analyzer 1908, $P_{in}$ monitor 1910, Rx channel selector 1912, $f_{BPF}$ adjuster 1914, and $\Delta f$ counter 1916 (i.e., some or all of the various components in the dashed box 1906 in FIG. 19), which may be selectively or collectively referred to as a "controller," and optionally the demodulator 1904, are implemented in an FPGA. In another embodiment of the invention the controller (and possibly also the demodulator 1904) is/are formed entirely in hardware as an application specific integrated circuit (ASIC). In yet another embodiment the controller (and possibly also the demodulator 1904) is/are encoded in software (computer program instructions) and stored as firmware in the program memory 2006 of a microcontroller 2002, as illustrated in FIG. 20. According to the latter approach, the microcontroller's CPU 2004 retrieves the computer program instructions from the program memory 2006 and, using the microcontroller's random access memory (RAM) 2008, executes the computer program instructions accordingly. Among the computer program instructions are instructions that direct how the CPU 2004 computes the EVM (or other signal quality figure of merit) of the demodulated baseband signal produced by the demodulator 1904; how the CPU 2004 converts the RF input power $P_{in}$ to digital form and determines whether it exceeds a predetermined maximum RF input power $P_{max}$ indicative of the possible presence of an exceptionally strong interferer; how the CPU 2004 generates the control signals that set and independently control $f_{BPF}$ and $f_{LO}$; and how the CPU 2004 counts to determine whether the tunable RF BPF 504 has been tuned across its entire tuning range $f_{BPF,min} < f_{BPF} < f_{BPF,max}$ in the effort to reject or suppress the offending interferer.

Figure 21:
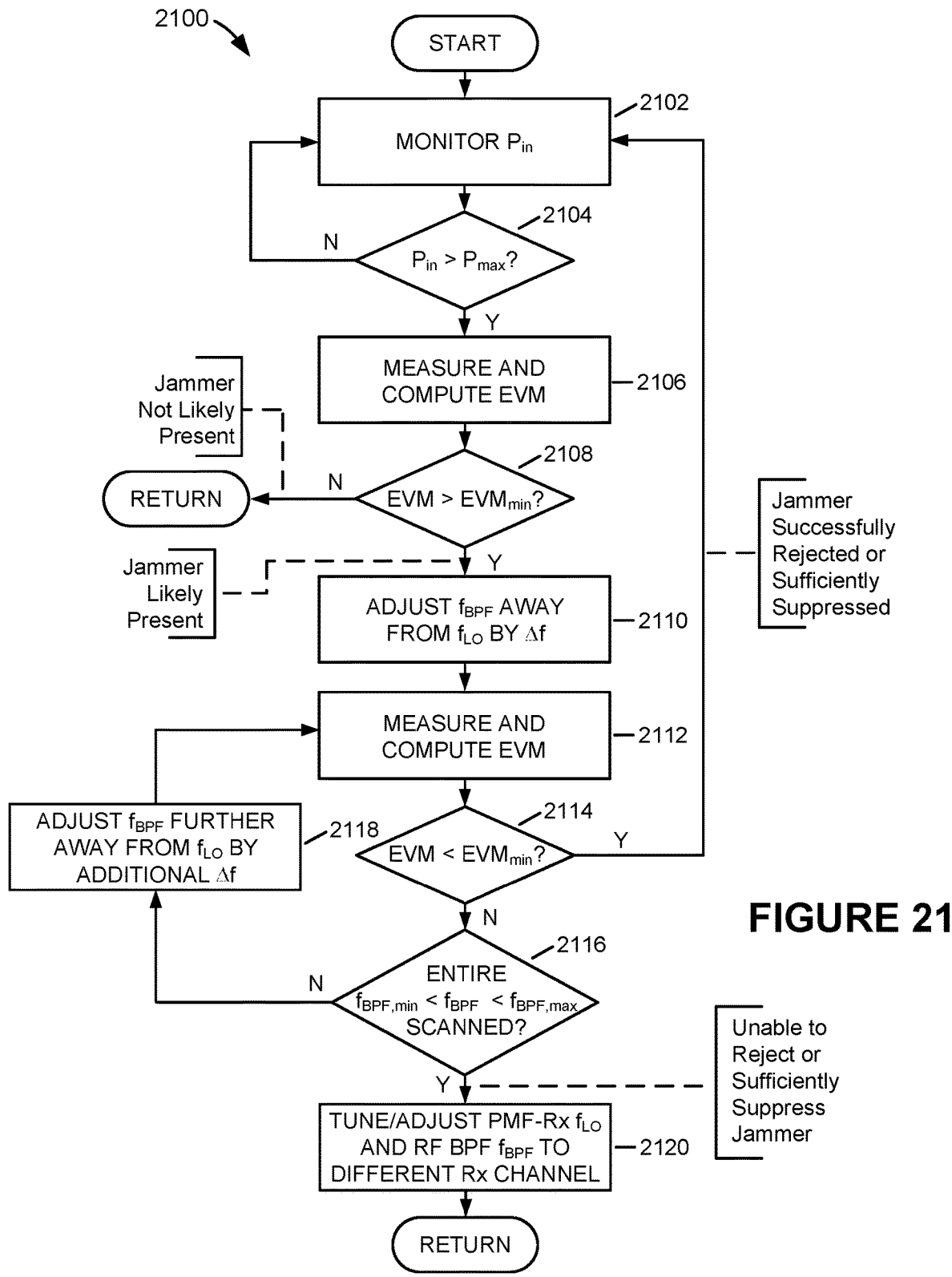
FIG. 21 is a flowchart of a method the central processing unit (CPU) of the microcontroller in FIG. 20 is programmed to perform in an effort to reject or suppress in-band and OOB interferers that interfere with the desired receive signal, according to one embodiment of the present invention.
Figure 22:
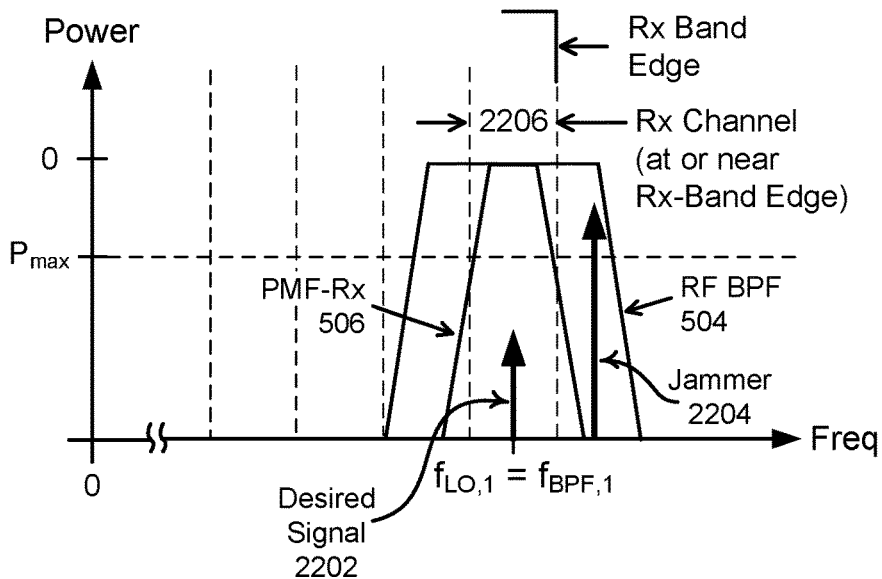
FIG. 22 is a frequency-domain drawing showing the desired signal in relation to the OOB jammer and an assumed initial positioning of the RF passbands provided by the RF BPF and PMF-Rx at the start of the method depicted in FIG. 21.

FIG. 21 is a flowchart illustrating a method 2100 the CPU 2004 performs as it executes these various operations in an effort to reject or suppress the exceptionally strong interferer. The method 2100 is applicable whether the exceptionally strong interferer is an in-band interferer falling within the Rx band of the receiver or is an OOB interferer falling outside the Rx band but near the Rx band edge, such as was described above in reference to FIG. 17. For purpose of illustration, the latter circumstance is assumed in the description of the method 2100 that follows. It is further assumed that the exceptionally strong interferer is an intrusive signal, specifically, a high-power jammer 2204, although the method 2100 is equally applicable to other types of interferers, regardless of whether they are intrusive or non-intrusive. Finally it is assumed that prior to the start of the method 2100 the center frequency $f_{BPF,1}$ of the tunable RF BPF 504 is initially aligned to the center frequency $f_{LO,1}$ of the RF passband provided by the PMF-Rx 506. This initial condition of $f_{LO,1} = f_{BPF}$ is denoted in FIG. 22.

Figure 23:
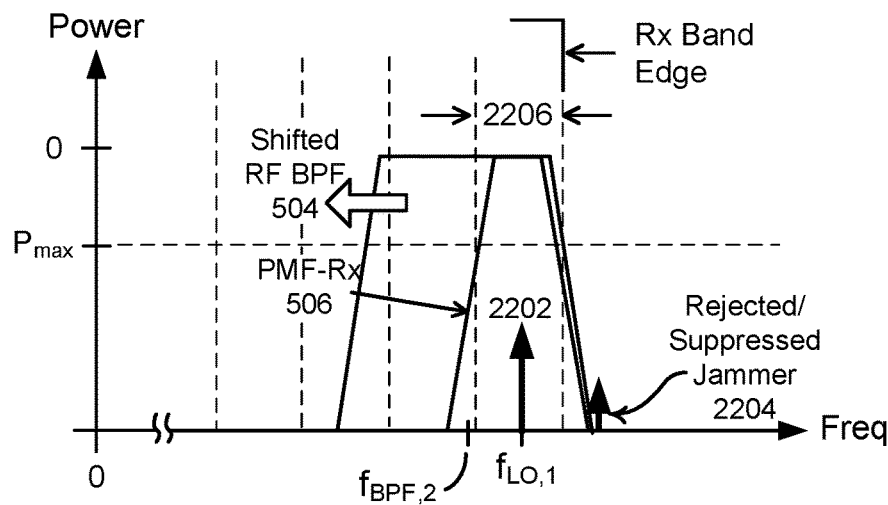
FIG. 23 is a frequency-domain drawing illustrating how, in the context of the method depicted in FIG. 21, tuning the center frequency $f_{BPF}$ of the RF BPF away from the center frequency $f_{LO}$ of the RF passband provided by the PMF-Rx can effectively reject or sufficiently suppress the OOB jammer.
Figure 24:
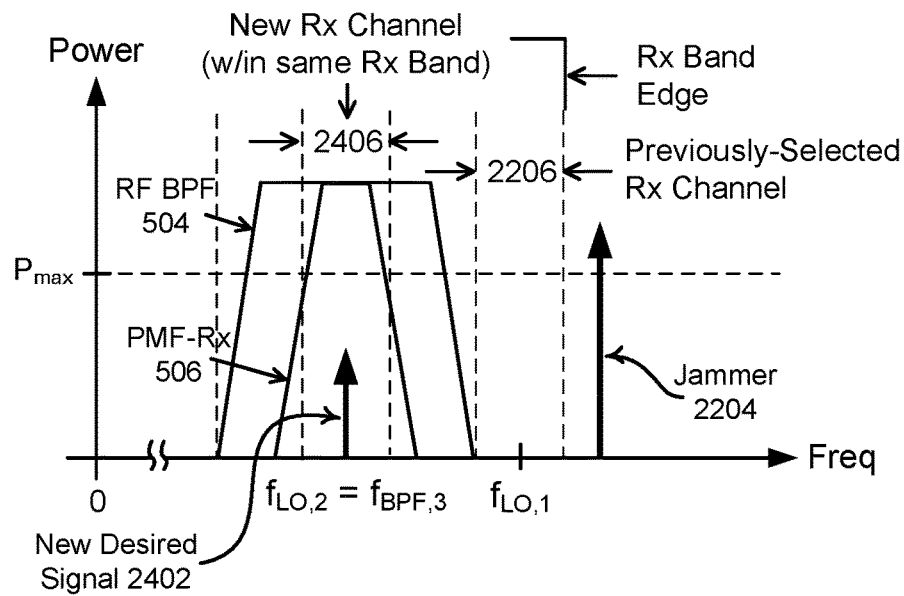
FIG. 24 is a frequency-domain drawing illustrating how, in the context of the method depicted in FIG. 21, the center frequency $f_{LO}$ of the RF passband provided by the PMF-Rx can be tuned to a different channel, if by tuning the center frequency $f_{BPF}$ of the RF BPF away from the center frequency $f_{LO}$ and across its full tuning range f $f_{BPF} < f_{BPF,max}$ the OOB jammer cannot be rejected or sufficiently suppressed.

During the first step 2102 of the method 2100 the CPU 2004 continuously monitors the RF input power $P_{in}$ of the RF signal being received by the receiver 1900 (preferably, after it has been filtered by the tunable RF BPF 504 and PMF-Rx 506 but before being amplified by the VGA in the analog processing section 510). Note that the RF input power $P_{in}$ includes not only the RF power of the desired signal 2202 but also the RF power of all other undesired signals not rejected by the combined filtering effect of the tunable RF BPF 504 and PMF-Rx 506, including the RF power of the jammer 2204 should it also be present and within the passband of the tunable RF BPF 504. Next, at decision 2104 the CPU 2004 determines whether the RF input power $P_{in}$ of the received signal is greater than a predetermined maximum RF input power $P_{max}$. If the CPU 2004 determines that $P_{in} > P_{max}$ (Yes ("Y") at decision 2104), that determination is an indication that a jammer may be present and interfering with the desired Rx signal (e.g., OOB jammer 2004 interfering with the desired Rx signal 2202, as in FIG. 22), though not necessarily. To determine whether the high P m is attributable to a jammer, or is instead to the desired Rx signal 2202 itself (such as may be the case if the source transmitter happens to be very close to the receiver 1900), at step 2104 the CPU 2004 measures and computes the EVM (or BER or other signal quality figure of merit) of the demodulated signal produced at the output of the demodulator 1904. If the measured/computed EVM is not greater than a predetermined error vector magnitude minimum $EVM_{min}$, in other words if a No ("N") results at decision 2108, the CPU 2004 concludes that a jammer is unlikely to be present and the method 2100 either ends or returns to step 2102. On the other hand, if at decision 2108 the CPU 2004 determines that $EVM < EVM_{min}$, ("Y" at decision 2108), the CPU 2004 concludes that an interferer (in this example, jammer 2204) is likely present and interfering with the desired signal 2202. In an effort to reject or at least sufficiently suppress the offending jammer 2204, at step 2110 the CPU 2004 directs the tunable RF BPF 504 to adjust its center frequency away from the center frequency $f_{LO,1}$ of the PMF-Rx 506 RF passband, by some small frequency increment $\Delta f$. Then, at step 2112, the CPU 2004 once again measures and computes the EVM of the demodulated signal produced at the output of the demodulator 1904. If the tuning of the tunable RF BPF 504 away from the center frequency $f_{LO,1}$ of the PMF-Rx 506 RF passband performed at step 2110 was successful at causing the EVM to reduce below $EVM_{min}$, in other words, if at decision 2116 the CPU 2004 determines that $EVM < EVM_{min}$, ("Y" at decision 2114), the CPU 2004 concludes that the jammer 2204 has been rejected or at least sufficiently suppressed and the method 2100 branches back to step 2102, where the CPU 2004 once again monitors the RF input power $P_{in}$ for the purpose of detecting the possible occurrence of a new jammer. On the other hand, if at decision 2114 the CPU 2004 determines that EVM is still greater than $EVM_{min}$ ("N" at decision 2114), the CPU 2004 directs the tunable RF BPF 504 to adjust its center frequency even further away from the center frequency $f_{LO,1}$ of the PMF-Rx 506 RF passband response, i.e., by an additional frequency increment of $\Delta f$, in an additional effort to reject or at least sufficiently suppress the offending jammer 2204. This process (step 2112, decision 2114, and step 2118) are repeated until either: 1) the EVM computed and measured by the CPU 2004 becomes less than $EVM_{min}$ (jammer 2204 successfully rejected or sufficiently suppressed, as illustrated in FIG. 23); or 2) the tunable RF BPF 504 has been tuned (scanned) across it entire tuning range yet the jammer 2204 was unable to be successfully rejected or sufficiently suppressed ("Y" at decision 2116). If the latter circumstance occurs ("Y" at decision 2116), no amount of adjustment of the tunable RF BPF 504 will result in the jammer 2204 being rejected or sufficiently suppressed, so at step 2120 the CPU 2004 directs the PMF-Rx 506 to tune to a different channel 2406 centered at a new LO frequency $f_{LO,2}$ and the tunable RF BPF 504 to adjust to a different center frequency $f_{BPB,3}$, as illustrated in FIG. 24, so that the new desired signal 2302 is then sufficiently far away from the jammer 2204 that the jammer 2204 can no longer substantially interfere. After step 2120 is completed, the method 2100 either ends or returns to first step 2102, where the CPU 2004 once again monitors the RF input power $P_{in}$ to detect the possible occurrence of a new interferer.

Figure 25:
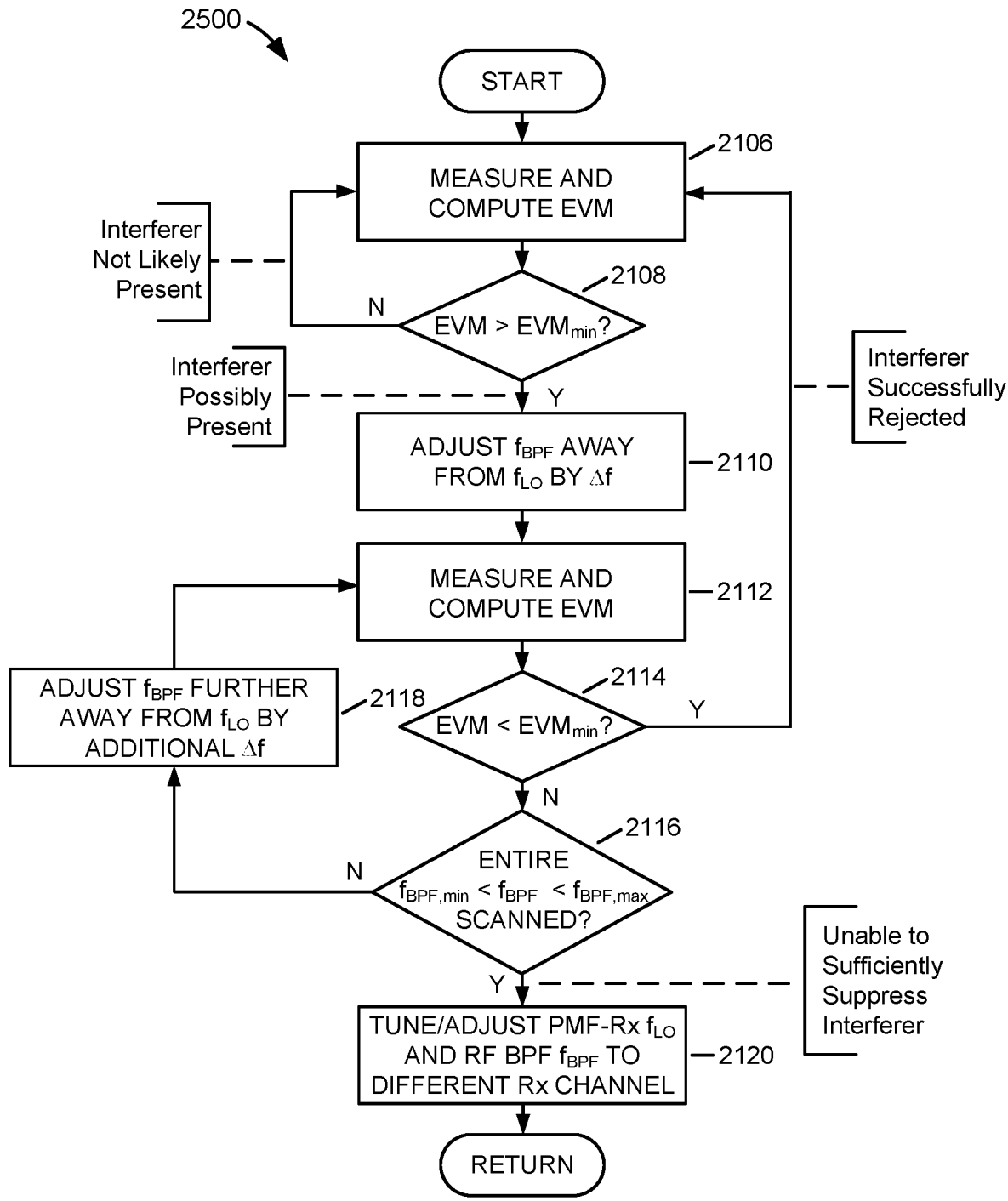
FIG. 25 is a flowchart of an alternative method the CPU of the microcontroller in FIG. 20 is programmed to perform in an effort to reject or suppress in-band and OOB interferers that interfere with the desired receive signal.

It should be mentioned that, depending on the application for which the 1900 is being used, the RF input power $P_{in}$ monitoring step 2102 and decision 2104 may be unnecessary or may not serve as a 100% reliable indicator of the possible presence of the 2204. This may occur, for example, if the interferer is not particularly strong so as to exceed $P_{max}$ but is nevertheless of sufficient RF power relative to the RF power of the desired Rx signal 2202 that significant distortion still occurs, despite the combined filtering of the tunable RF BPF 504 and PMF-Rx 506. In such applications detecting the presence of a possible interferer can be better achieved without step 2102 and decision 2104. In other words, the $P_{in}$ monitor 910 would not be needed in the receiver 1900 and step 2102 and decision 2104 in method 2100 can be omitted, as illustrated in the modified method 2500 shown in FIG. 25. With this modification, detecting the possible presence of the interferer 2204 is sufficiently served by simply continuously comparing the EVM of the demodulated signal to the reference threshold $EVM_{min}$.

Figure 26:
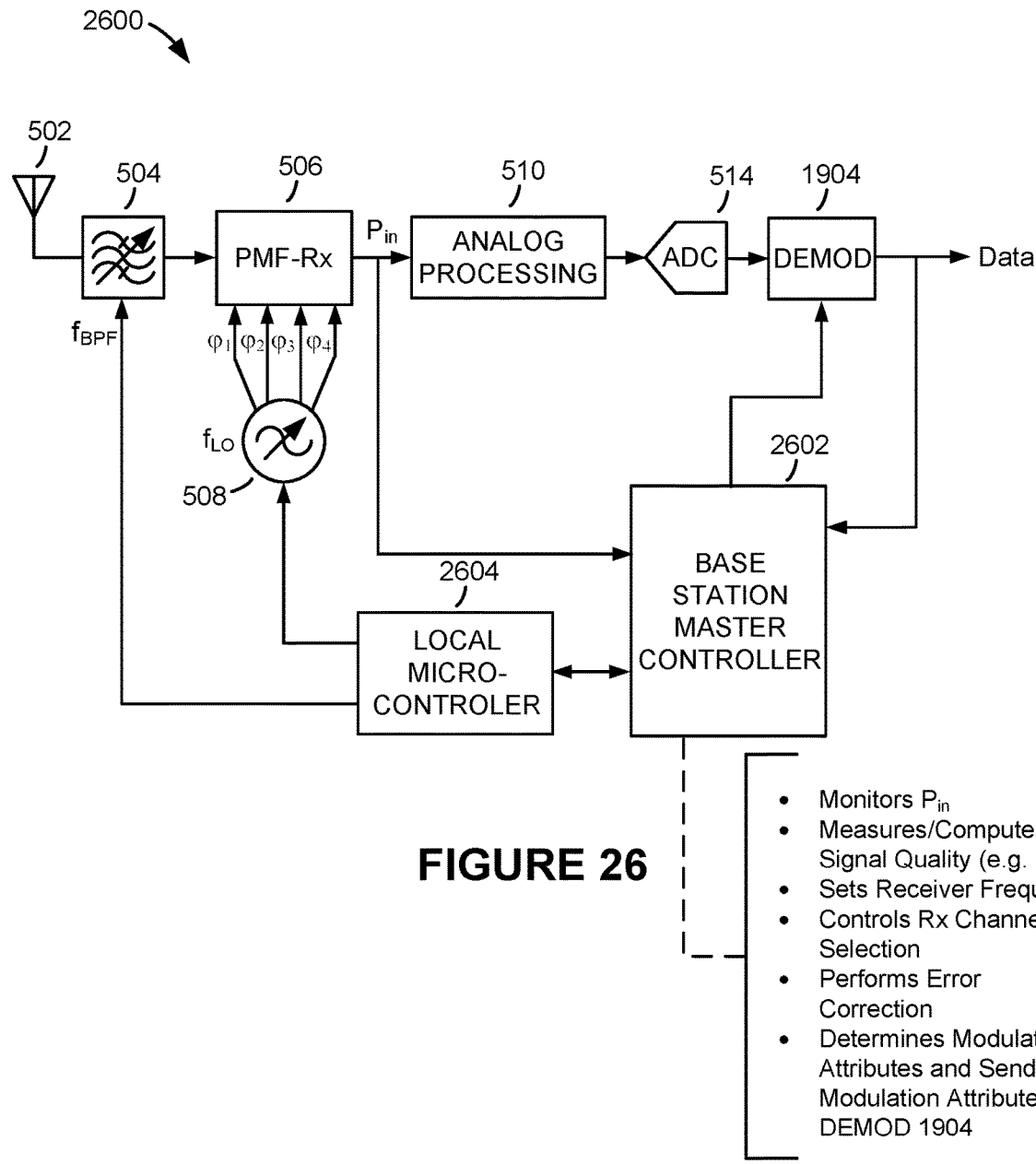
FIG. 26 is a drawing of an RF receiver according to another embodiment of the present invention.

It should also be emphasized that the receiver 500 and receiver 1900 are not limited to any particular application and may be adapted for use in essentially any RF communication in which interferers, whether intentional or unintentional, are of concern. For example, either receiver 500 or 1900 may be adapted to serve as an RF receiver in a Wi-Fi router or wireless access point, as an RF receiver in a Bluetooth device in a personal area network, or as an RF receiver in a cellular handset or telecommunications base station. FIG. 26 illustrates, for example, one way the receiver 1900 can be adapted for use in a telecommunications base station. According to this exemplary embodiment of the invention, the controller of the receiver 2600 comprises a base station master controller 2602 (e.g., a computer or additional microcontroller configured to serve as a master) and a local microcontroller 2604 configured to serve as a slave, rather than just a single local microcontroller 2002. The local microcontroller 2604 tunes the tunable RF BPF 504 and adjusts the frequency $f_{LO}$ of the multi-phase LO clock generator 508 of the PMF-Rx 506, but unlike the local microcontroller 2002 in the receiver 1900 the tuning and adjustment is initiated and controlled under the command and control of the base station master controller 2602. Further, rather than monitoring the RF input power $P_{in}$ and computing the signal quality of the demodulated signal locally, as the microcontroller 2002 does in the receiver 1900, the base station master controller 2602 is programmed to perform those tasks.

While various embodiments of the present invention have been described, they have been presented by way of example and not limitation. It will be apparent to persons skilled in the relevant art that various changes in form and detail may be made to the exemplary embodiments without departing from the true spirit and scope of the invention. Accordingly, the scope of the invention should not be limited by the specifics of the exemplary embodiments but, instead, should be determined by the appended claims, including the full scope of equivalents to which such claims are entitled.

The invention claimed is:

1. A radio frequency (RF) receiver, comprising:
   an antenna;
   a baseband processing section including an analog processing section and a digital processing section; and
   a receiver front end coupled between the antenna and the baseband processing section, the receiver front end comprising a tunable RF bandpass filter (RF BPF) coupled to the antenna and a passive mixer-first receiver (PMF-Rx) coupled between an output of the tunable RF BPF and an input of the baseband processing section,
   wherein the PMF-Rx is configured to serve as both a mixer that downconverts a received RF signal to baseband and as a second RF BPF that operates synergistically with the tunable RF BPF to enhance the signal-to-noise ratio of the receiver front end.

2. The RF receiver of claim 1, wherein the tunable RF BPF has a passband with center frequency $f_{BPF}$, the second RF BPF provided by the PMF-Rx has a passband with center frequency $f_{LO}$, and $f_{BPF}$ and $f_{LO}$ are independently tunable.

3. The RF receiver of claim 1, wherein the PMF-Rx is tunable across multiple channels within a given Rx band and the PMF-Rx and tunable RF BPF are operable to reject or suppress out-of-band interferers that fall outside the given Rx band.

4. The RF receiver of claim 3, wherein a bandwidth of a passband of the second RF BPF provided by the PMF-Rx is comparable to a width of a single channel, and a bandwidth of the passband provided by the tunable RF BPF is wider than the bandwidth of the passband of the second RF BPF provided by the PMF-Rx.

5. The RF receiver of claim 4, wherein the tunable RF BPF is tunable band-wide and further operable to reject or suppress in-band interferers that fall within the given Rx band but outside the passband of the second RF BPF provided by the PMF-Rx.

6. The RF receiver of claim 5, wherein the tunable RF BPF passband has a center frequency $f_{BPF}$, the passband of the second RF BPF provided by the PMF-Rx has a center frequency $f_{LO}$, and $f_{BPF}$ and $f_{LO}$ are independently tunable.

7. The RF receiver of claim 1, wherein the tunable RF BPF is continuously and dynamically tunable.

8. The RF receiver of claim 2, further comprising a controller configured to detect and determine whether an interferer is present and interfering with reception of the received RF signal.

9. The RF receiver of claim 8, wherein the controller comprises a signal analyzer configured to measure a signal quality of a demodulated digital baseband signal produced by the digital processing section and an $f_{BPF}$ adjuster that adjusts the tunable RF BPF to a different center frequency upon the controller determining that the signal quality of the demodulated digital baseband signal has traversed a predetermined signal quality threshold.

10. The RF receiver of claim 8, wherein the controller further comprises:
   an RF input power monitor configured to monitor and compare an RF input power $P_{in}$ of the received RF signal to a predetermined maximum RF input power $P_{max}$;
   a signal analyzer configured to measure a signal quality of a demodulated digital baseband signal produced by the digital processing section; and
   an $f_{BPF}$ adjuster that adjusts the tunable RF BPF to a different center frequency upon the controller determining that both $P_{in} > P_{max}$ and the signal quality of the demodulated digital baseband signal has traversed a predetermined signal quality threshold.

11. The RF receiver of claim 1, wherein the tunable RF BPF does not comprise an acoustic-wave-type filter or bank of acoustic-wave-type filters.

12. A method of rejecting or suppressing interferers received by a radio frequency (RF) receiver, comprising:
   RF filtering an RF input signal through a tunable RF bandpass filter (RF BPF);
   exploiting an impedance translation property of a passive mixer-first receiver (PMF-Rx), augmenting said RF filtering using the PMF-Rx; and
   downconverting the resulting RF-filtered RF signal to baseband using the PMF-Rx.

13. The method of claim 12, wherein the tunable RF BPF has a passband with center frequency $f_{BPF}$, an RF passband provided by the PMF-Rx has a center frequency $f_{LO}$, and $f_{BPF}$ and $f_{LO}$ are independently tunable.

14. The method of claim 13, further comprising:
measuring a signal quality of a baseband signal resulting from downconverting the filtered RF signal to baseband; and
tuning $f_{BPF}$ of the tunable RF BPF to a different center frequency in an effort to reject or suppress an interferer that is distorting a desired RF Rx signal contained within the RF input signal.

15. The method of claim 14, wherein measuring the signal quality of the baseband signal comprises measuring and computing the error vector magnitude (EVM) of the baseband signal.

16. The method of claim 14, wherein the PMF-Rx is tunable across multiple channels within a given Rx band and the tunable RF BPF is continuously and independently tunable relative to the tuning of the PMF-Rx.

17. The method of claim 16, further comprising tuning the PMF-Rx to a different channel if tuning $f_{BPF}$ of the tunable RF BPF to a different center frequency does not result in the interferer being rejected or sufficiently suppressed.

18. The method of claim 13, further comprising:
monitoring an RF input power $P_{in}$ of the RF input signal after the RF input signal has been filtered by the tunable RF BPF and PMF-Rx;
comparing the RF input power $P_{in}$ to a maximum RF power reference $P_{max}$;
measuring a signal quality of a baseband signal resulting from downconverting the filtered RF signal to baseband;
comparing the measured signal quality to a predetermined signal quality threshold; and
if both $P_{in} > P_{max}$ and the measured signal quality traverses the predetermined signal quality threshold, tuning $f_{BPF}$ of the tunable RF BPF to a different center frequency in an effort to reject or suppress an interferer that is distorting a desired RF Rx signal contained within the RF input signal.

19. The method of claim 18, wherein the RF passband provided by the PMF-Rx is tunable across multiple channels within a given Rx band and the tunable RF BPF is continuously and independently tunable relative to the tuning of the PMF-Rx.

20. The method of claim 19, further comprising tuning the PMF-Rx to a different channel if tuning $f_{BPF}$ of the tunable RF BPF to a different center frequency does not result in the interferer being rejected or sufficiently suppressed.

21. The method of claim 12, wherein the RF passband provided by the PMF-Rx is tunable across multiple channels within a given Rx band and the tunable RF BPF is continuously and independently tunable relative to the tuning of the PMF-Rx.

22. The method of claim 21, wherein a bandwidth of the RF passband provided by the PMF-Rx is comparable to a width of a single channel and a bandwidth of the passband of the tunable RF BPF is wider than the RF passband provided by the PMF-Rx.

23. The method of claim 22, wherein the tunable RF BPF is tunable band-wide and operable to reject or suppress in-band interferers that fall within the given Rx band but outside the RF passband provided by the PMF-Rx.

24. The method of claim 12, wherein the tunable RF BPF does not comprise an acoustic-wave-type filter or bank of acoustic-wave-type filters.

* * * * *